Dec. 8, 1942.  L. E. PRATT  2,304,766
UNIVERSAL COUPLING
Filed Aug. 3, 1940
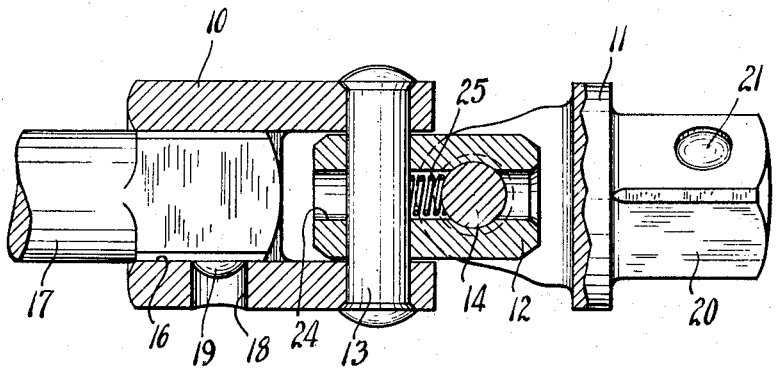
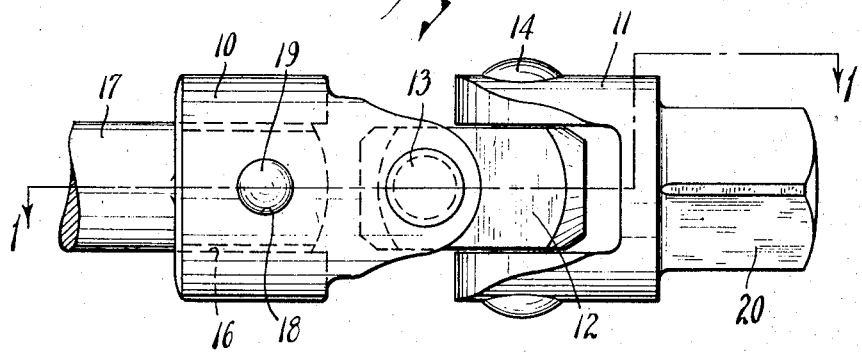
INVENTOR
LAWRENCE E. PRATT
BY
ATTORNEYS Patented Dec. 8, 1942

2,304,766

UNITED STATES PATENT OFFICE 2,304,766

UNIVERSAL COUPLING

Lawrence E. Pratt, Bedford, Ohio, assignor to The Cornwell Quality Tools Company, Mogadore, Ohio, a corporation of Ohio Application August 3, 1940, Serial No. 350,350

4 Claims. (Cl. 64—17)

This invention relates to mechanical elements of the type commonly known as universal joints or couplings, the general purpose of which is to transmit rotary motion from one shaft to another when the shafts are disposed at an angle to one another, as well as when they are in alignment.

Such couplings are usefully employed in many different situations. For example, they may be employed in wrenches or other tools comprising articulated sections. Another use of the couplings is in flexible shafting for delivering power to a point relatively remote from the prime mover. In both situations mentioned it is frequently desirable that relative movement between the articulated sections be braked, that is, that their freedom of relative movement be retarded or restrained to the end that, in the case of wrenches or tools, the sectional elements may be maintained in adjusted angular positions. In the case of flexible shafting, drag means in the universal couplings prevents whipping of the shafting due to unrestrained rotation thereof. Accordingly, it is to improvements in the braked type of universal couplings that this invention primarily is directed.

The chief objects of the invention are to provide simplified construction in couplings of the character mentioned. More specifically, the invention aims to provide a braked coupling employing but one simple element not required in free turning couplings. Other objects will be manifest as the description proceeds.

Of the accompanying drawing:

Figure 1 is an axial sectional view of a coupling embodying the invention, taken on the line 1—1 of Fig. 2; and Figure 2 is a side elevation of the improved coupling.

Referring to the drawing, 10 and 11 designate the respective forked elements of the coupling, and 12 is a connecting block of oblong shape embraced by said elements and pivotally connected to each of them by a pair of pins 13, 14, that are disposed at right angles to each other. Each of the pins is permanently secured to its associated forked member by being riveted or otherwise secured thereto so as to be non-rotatable relatively thereof.

Forked member 10 is formed with the usual square axial socket 16 for receiving a tool or shaft element such as that shown at 17, there being a bore 18 opening into the socket 16 for receiving a ball detent 19 carried by the element 17 as a means for retaining said element in said socket. The forked element 11 is formed with a square integral head 20 that is provided with a ball detent 21, said head being receivable in a suitable socket of a wrench or shaft element (not shown).

The pins 13, 14 extend freely through respective bores in the connecting block 12. The latter also is formed with an axial bore 24 that, as shown, extends from end to end thereof and intersects the transverse bores in which the pins 13, 14 are received. However, the bore 24 need only extend from one end of the block to the farthest transverse bore if desired. Mounted in the bore 24 is an expansible member 25 herein shown as a helical wire spring, said spring being under compression so as to exert an expansive force that is directed laterally against the pins 13, 14, thereby urging them against the surface of the bores of the connecting block 12. The arrangement is such as to create substantial friction between the pins 13, 14 and the connecting block 12, which friction opposes relative movement between the latter and the pins and exerts the braking effect desired.

The spring 25 is the only element of the coupling not present in the conventional, unbraked couplings. Because the axial bore 24 of the connecting block extends from an end thereof it is a simple matter to mount the spring in operative position therein.

Modification may be resorted to without departing from the spirit of the invention, or the scope thereof as defined by the appended claims.

What is claimed is:

1. In a coupling of the character described, the combination of a driving element, a driven element, a connecting block between said elements, pivot pins non-rotatably secured in the respective driving and driven elements pivotally connecting the same to the connecting block, and yielding means carried by said connecting block maintaining friction between the latter and said pins as a means for exerting a braking effect upon relative angular movement between the connecting block and the driving and driven elements.

2. In a universal coupling, the combination of a pair of opposed forked members, a connecting block between said forked members, pivot pins non-rotatably secured to the respective forked members pivotally mounted in respective bores in the connecting block, and means engaging said pivot pins normally urging them laterally against the surface of their bores to maintain substantial friction therebetween.

3. In a universal coupling, the combination of a pair of opposed forked members, a connecting block interposed therebetween, pivot pins nonrotatably secured to the respective forked members pivotally mounted in respective transverse bores in the connecting block, and an expansive member mounted in the connecting block between said pins and normally exerting pressure against both of the latter to urge them laterally in opposite directions against the surface of their bores as a means for maintaining substantial friction between the connecting block and pins, which friction opposes relative angular movement therebetween.

4. In a universal coupling, the combination of a pair of opposed forked members, a connecting block interposed therebetween, said connecting block being formed with two transverse bores disposed at right angles to each other and formed with an axial bore intersecting said transverse bores, pivot pins journaled in the respective transverse bores and having their ends nonrotatably secured to respective forked members, and a compression spring mounted in the axial bore between the pivot pins normally urging the latter against the surface of their bores to maintain substantial friction therebetween.

LAWRENCE E. PRATT.